US010802039B2

(12) United States Patent
Andissac et al.

(10) Patent No.: US 10,802,039 B2
(45) Date of Patent: Oct. 13, 2020

(54) METHOD AND SYSTEM FOR ESTIMATING THE FLAPS POSITION OF AN AIRCRAFT

(71) Applicant: Airbus Operations S.A.S., Toulouse (FR)

(72) Inventors: David Andissac, Toulouse (FR); Maxime Semat, Toulouse (FR)

(73) Assignee: Airbus Operations S.A.S. (FR)

( * ) Notice: Subject to any disclaimer, the term of this patent is extended or adjusted under 35 U.S.C. 154(b) by 150 days.

(21) Appl. No.: 16/188,764

(22) Filed: Nov. 13, 2018

(65) Prior Publication Data

US 2019/0162746 A1 May 30, 2019

(30) Foreign Application Priority Data

Nov. 27, 2017 (FR) ...................... 17 61210

(51) Int. Cl.
| | | |
|---|---|---|
| G01P 13/02 | (2006.01) |
| B64C 13/50 | (2006.01) |
| B64C 9/16 | (2006.01) |
| B64D 43/00 | (2006.01) |
| G01C 9/00 | (2006.01) |
| G05D 1/08 | (2006.01) |

(52) U.S. Cl.
CPC .............. *G01P 13/025* (2013.01); *B64C 9/16* (2013.01); *B64C 13/50* (2013.01); *B64D 43/00* (2013.01); *G01C 9/005* (2013.01); *G05D 1/0825* (2013.01)

(58) Field of Classification Search
CPC .......... G01P 13/025; G01P 5/165; G01P 5/14; G01P 5/16; G01P 13/02; G01P 21/025; G01P 3/62; G01P 5/12; G01P 5/00; G01P 5/17; G01P 5/175; G01P 15/036; G01P 1/02; G01P 1/10; G01P 21/00; G01P 5/04; G01P 5/10; G01P 7/00; G01P 5/07; G01P 5/08; G01P 5/245; B64D 43/02; B64D 43/00; B64D 45/00
USPC ............................................. 73/170.02, 180
See application file for complete search history.

(56) References Cited

U.S. PATENT DOCUMENTS

| | | | | |
|---|---|---|---|---|
| 3,221,549 A | * | 12/1965 | Wetmore ............... | B64D 43/02 73/178 R |
| 4,046,341 A | * | 9/1977 | Quinlivan ............ | G05D 1/0825 244/181 |
| 6,073,084 A | | 6/2000 | Le Tron | |
| 2001/0028315 A1 | * | 10/2001 | Frantz ................... | G01P 13/025 340/945 |
| 2010/0100260 A1 | | 4/2010 | McIntyre et al. | |
| 2017/0139425 A1 | * | 5/2017 | Miranda De Souza | B64C 13/18 |
| 2017/0284856 A1 | * | 10/2017 | Hagerott ................ | G01G 19/07 |

(Continued)

*Primary Examiner* — Andre J Allen
(74) *Attorney, Agent, or Firm* — Lerner, David, Littenberg, Krumholz & Mentlik, LLP

(57) ABSTRACT

An estimation system includes a module for measuring a current angle of attack and current flight parameters of the aircraft, a module for estimating a current lift coefficient of the aircraft from the current flight parameters and from a mass of the aircraft, a module for estimating an angle of attack for a zero lift from the current angle of attack, from the current lift coefficient and from a slope of an affine part of at least one theoretical curve describing a lift coefficient of the aircraft as a function of an angle of attack, a module for estimating the current position of the flaps of the aircraft from the angle of attack for a zero lift and a module for sending the current position of the flaps to a user device.

11 Claims, 3 Drawing Sheets

(56) References Cited

U.S. PATENT DOCUMENTS

2018/0356437 A1\* 12/2018 Luo ................... G01P 21/025
2018/0356439 A1\* 12/2018 Luo ................... B64D 45/0005
2019/0248475 A1\* 8/2019 Shmilovich .......... G05D 7/0664
2020/0122854 A1\* 4/2020 Cui .................... G07C 5/008

\* cited by examiner

METHOD AND SYSTEM FOR ESTIMATING THE FLAPS POSITION OF AN AIRCRAFT

FIELD OF THE INVENTION

The present invention relates to the field of the flight controls of an aircraft. It deals in particular with the estimation of the position of the flaps of an aircraft.

BACKGROUND OF THE INVENTION

In aircraft take-off and landing phases, the slats and the flaps which are mounted on the wings of the aircraft are extended in order to increase the lift coefficient of the aircraft and to fly at a lesser speed than at a speed for which the slats and the flaps are not extended.

Generally, the position of the slats and of the flaps is controlled by slats and flaps control computers (SFCC) which transmit position commands based on the position of a configuration control lever in the cockpit. The configuration control lever makes it possible to control the positions of the slats and of the flaps according to different configurations.

The position, controlled by the control computers SFCC, is measured using dedicated sensors. For example, these sensors include the Asymmetric Position Pick-off Unit (APPU), the Indicated Position Pick-off Unit (IPPU) and the Feedback Position Pick-Off Unit (FPPU).

The loss of the measurements of the position of the slats and flaps can result in a degradation of the operation of the automatic pilot (or autopilot) and of the flight director and/or a degradation of the piloting laws.

For the case of the flaps, the loss of measurement thereof can occur in the case of failure of the FPPU unit, in the case of failure of a differential gearbox used by the IPPU unit or in the case of failure of the control computer or computers SFCC.

In the case of loss of the measurements of the position of the slats and of the flaps, the aircraft can be in a default configuration which depends on the position of the landing gears and not on the position of the slats and flaps. For example, if the landing gears are extended, it is considered that the aircraft is in a so-called "FULL" configuration. If the landing gears are retracted, it is considered that the aircraft is in a so-called "CLEAN" configuration.

However, an estimation of the precise position of the flaps would allow for an improvement in the operation of the autopilot or of the operation according to the normal piloting law in case of loss of measurement of the position of the flaps.

BRIEF SUMMARY OF THE INVENTION

Aspects of the present invention may mitigate these drawbacks by proposing a method and a system that make it possible to estimate, in real time, the position of the flaps and to deduce, from the estimated position of the flaps, the current configuration of the aircraft in case of loss of the measurements of the position of the flaps and of the slats.

An aspect of the invention relates to a method for estimating the position of flaps of an aircraft.

According to an aspect of the invention, the estimation method comprises:

a measurement step, implemented by a measuring module, including measuring a current angle of attack of the aircraft and current flight parameters of the aircraft;

a first estimation step, implemented by a first estimating module, including estimating a current lift coefficient of the aircraft from the current flight parameters and from a mass (m) of the aircraft;

a second estimation step, implemented by a second estimating module, including estimating an angle of attack for a zero lift from the current angle of attack, from the current lift coefficient estimated in the first estimation step and from a slope of an affine part of at least one theoretical curve describing a lift coefficient of the aircraft as a function of an angle of attack;

a third estimation step, implemented by a third estimating module, including estimating the current position of the flaps of the aircraft from the angle of attack for a zero lift, estimated in the second estimation step;

a sending step, implemented by a sending module, including sending the current position of the flaps to a user device.

Thus, by virtue of an aspect of the invention, it is possible to estimate the current position of the flaps from the current angle of attack and from current flight parameters; this allows for an improvement of the operation of the autopilot or of the operation according to the normal piloting law upon a loss of the measurements of position of the flaps.

Furthermore, the measurement step comprises:

a first measurement substep, implemented by a first measuring submodule, consisting in measuring a vertical component of a current load factor of the aircraft;

a second measurement substep, implemented by a second measuring submodule, consisting in measuring a current static pressure;

a third measurement substep, implemented by a third measuring submodule, consisting in measuring a current Mach number of the aircraft;

a fourth measurement substep, implemented by a fourth measuring submodule, consisting in measuring the current angle of attack of the aircraft.

Furthermore, the first estimation step includes estimating the current lift coefficient of the aircraft from the following expression:

$$C_z = \frac{2 n_z m g}{\gamma P_s M^2 S},$$

in which:

$n_z$ corresponds to the vertical component of a current load factor of the aircraft, m corresponds to the current mass of the aircraft, g corresponds to the acceleration of gravity, $\gamma$ corresponds to the adiabatic coefficient for air, $P_s$ corresponds to the current static pressure, M corresponds to the current Mach number of the aircraft, S corresponds to a reference surface of wings of the aircraft.

In a particular embodiment, the slope used in the second estimation step corresponds to an average of slopes, each of the slopes corresponding to a slope of the affine part of each of the theoretical curves describing a lift coefficient of the aircraft as a function of an angle of attack.

According to a particular feature, each of the theoretical curves is defined for a possible configuration of the aircraft.

According to another particular feature, the method comprises a determination step, implemented by a determination module, consisting in determining the theoretical curve or curves, each of the theoretical curves being determined for a configuration of the aircraft.

Furthermore, the third estimation step also includes estimating the current configuration or configurations of the aircraft from the estimated current position of the flaps of the aircraft.

The invention relates also to a system for estimating the position of flaps of an aircraft.

According to an embodiment of the invention, the estimation system comprises:

a measuring module configured to measure a current angle of attack of the aircraft and current flight parameters of the aircraft;

a first estimating module configured to estimate a current lift coefficient of the aircraft from the current flight parameters and from a mass of the aircraft;

a second estimating module configured to estimate an angle of attack for a zero lift from the current angle of attack, from the current lift coefficient estimated by the first estimating module and from a slope of an affine part of at least one theoretical curve describing a lift coefficient of the aircraft as a function of an angle of attack;

a third estimating module configured to estimate the current position of the flaps of the aircraft from the angle of attack for a zero lift estimated by the second estimating module;

a sending module configured to send the current position of the flaps to a user device.

Furthermore, the measuring module comprises:

a first measuring submodule configured to measure a vertical component of a current load factor of the aircraft;

a second measuring submodule configured to measure a current static pressure;

a third measuring submodule configured to measure a current Mach number of the aircraft;

a fourth measuring submodule configured to measure the current angle of attack of the aircraft.

Furthermore, the system comprises a determination module configured to determine the theoretical curve or curves, each of the theoretical curves being determined for a configuration of the aircraft.

The invention relates also to an aircraft, in particular a transport aeroplane, comprising a system for estimating the position of the flaps of an aircraft, as described above.

BRIEF DESCRIPTION OF THE DRAWINGS

The invention, with its features and advantages, will emerge more clearly on reading the description given with reference to the attached drawings in which.

DETAILED DESCRIPTION

The invention relates to a system 1 for estimating the position of flaps 7 of an aircraft AC and a method for estimating the position of flaps 7 of an aircraft AC. Hereinafter in the description, the system 1 for estimating flaps 7 of an aircraft AC is called the estimation system 1. Similarly, the method for estimating the position of flaps 7 of an aircraft AC is called estimation method.

Figure 1:
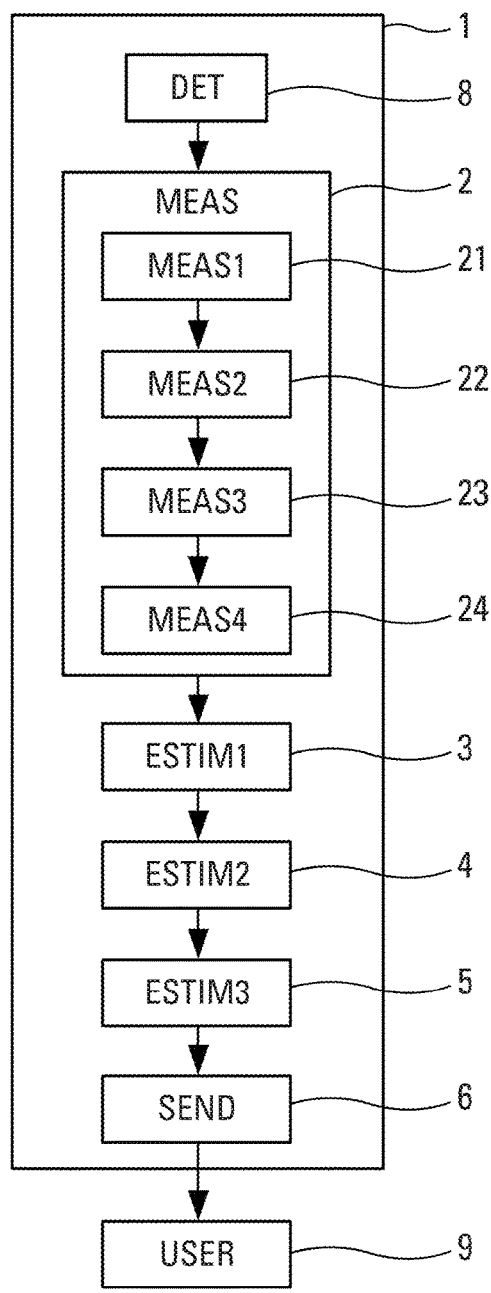
FIG. 1 schematically represents the system for estimating the position of the flaps, FIG. 2 schematically represents the method for estimating the position of the flaps.
Figure 2:
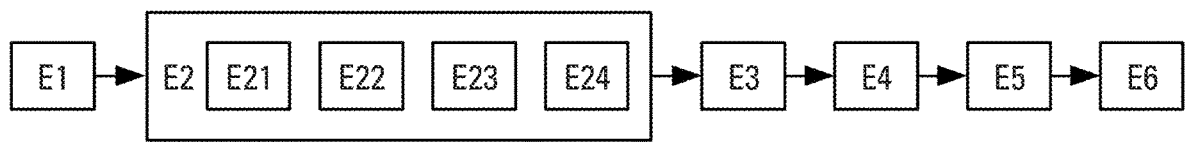
Figure 6:
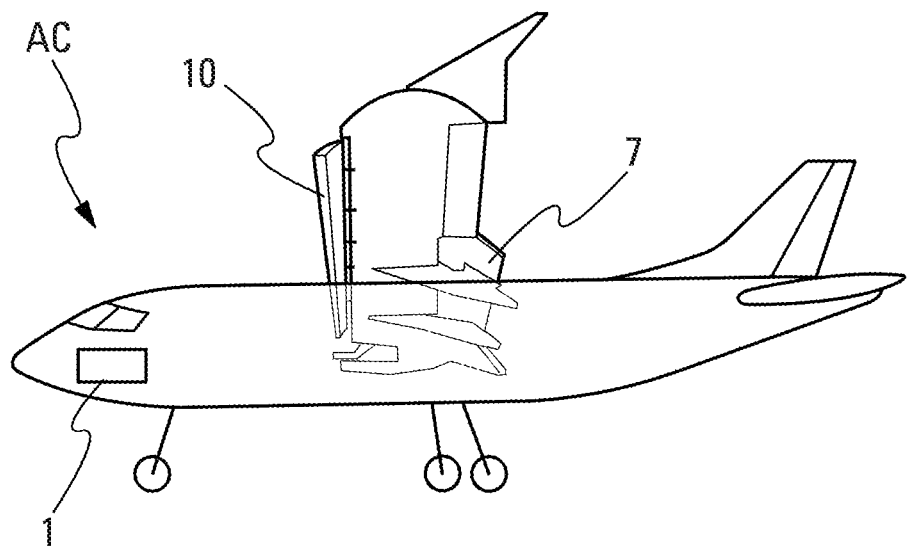
FIG. 6 represents a profile view of an aircraft having flaps and slats.

FIG. 1 represents an embodiment of the estimation system 1 which can be embedded on an aircraft AC (FIG. 6).

The estimation system 1 comprises a measuring module MEAS 2 configured to measure a current angle of attack $\alpha$ of the aircraft AC and current flight parameters of the aircraft AC.

According to one embodiment, the measuring module 2 comprises:

a measuring submodule MEAS1 21 configured to measure a vertical component of a current load factor $n_z$ of the aircraft AC;

a measuring submodule MEAS2 22 configured to measure a current static pressure $P_s$;

a measuring submodule MEAS3 23 configured to measure a current Mach number M of the aircraft AC;

a measuring submodule MEAS4 24 configured to measure the current angle of attack $\alpha$ of the aircraft AC.

The measuring submodule 21 can comprise an inertial unit that makes it possible to determine the vertical component of the current load factor $n_z$ of the aircraft AC.

The measuring submodule 22 can comprise a static pressure sensor making it possible to measure the current static pressure $P_s$.

The measuring submodule 23 can comprise a machmetre making it possible to determine the Mach number M. Usually, the Mach number M can be determined from the current static pressure $P_s$ measured by the static pressure sensor and from the current total pressure measured by a total pressure sensor.

The measuring submodule 24 can comprise an incidence metre making it possible to determine the angle of attack.

The estimation system also comprises an estimating module ESTIM1 3 configured to estimate a current lift coefficient $C_z$ of the aircraft AC from the current flight parameters and from a mass m of the aircraft AC.

According to the embodiment cited above, the flight parameters comprise at least the current load factor $n_z$ of the aircraft AC, the current static pressure $P_s$, the current Mach number M of the aircraft AC.

The current lift coefficient $C_z$ of the aircraft AC can be estimated from the following expression:

$$C_z = \frac{2n_z mg}{\gamma P_s M^2 S},$$

in which:

$n_z$ corresponds to the vertical component of the current load factor of the aircraft AC (no units), m corresponds to the current mass of the aircraft AC (in kilograms), g corresponds to the acceleration of gravity (constant equal to 9.81 m·s$^{-2}$), $\gamma$ corresponds to the adiabatic coefficient for air (constant without units equal to 1.4), $P_s$ corresponds to the current static pressure (in Pascals), M corresponds to the current Mach number of the aircraft AC (without units), S corresponds to a reference surface of wings of the aircraft AC (constant in square metres).

The value of the constant of the reference surface of wings S depends on the type of aircraft.

The estimation system 1 also comprises an estimating module ESTIM2 4 configured to estimate an angle of attack $\alpha_0$ for a zero lift from the current angle of attack $\alpha$, from the current lift coefficient $C_z$ estimated by the first estimating module 3 and from a slope $C_{z\alpha}$ of an affine part of at least one theoretical curve $C_z(\alpha)$ describing a lift coefficient of the aircraft AC as a function of an angle of attack.

Figure 3:
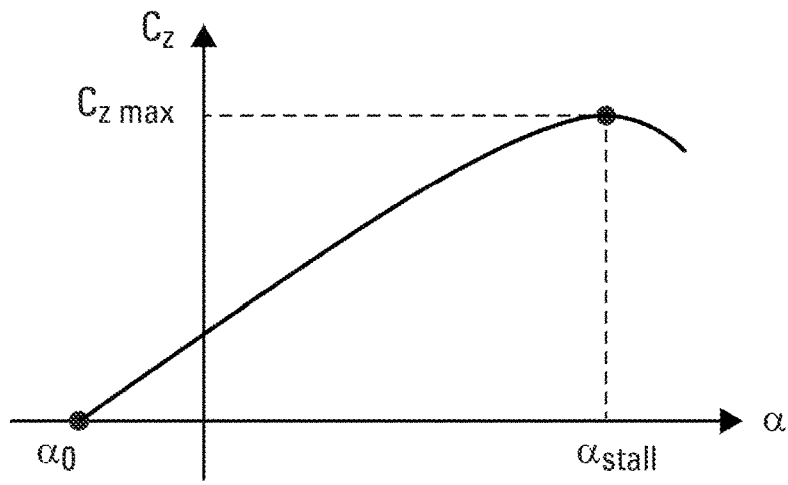
FIG. 3 represents a theoretical curve describing a lift coefficient as a function of an angle of attack.
Figure 4:
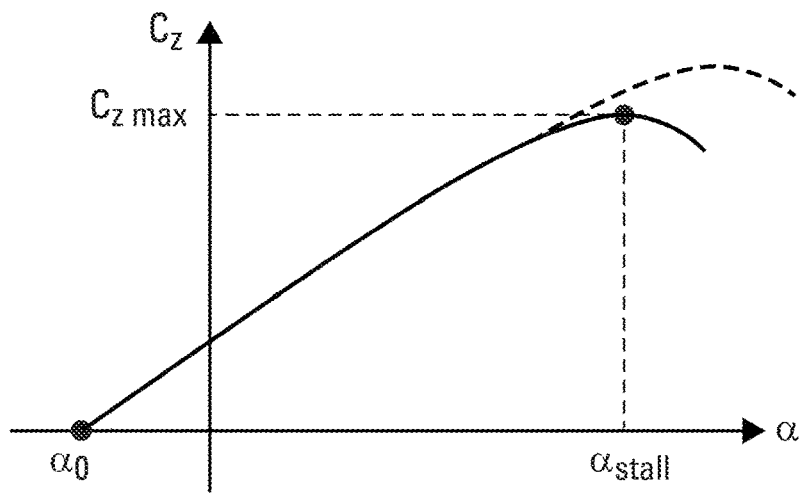
FIG. 4 represents a modification of the theoretical curve of FIG. 3 caused by an extension of the slats.

FIG. 3 represents a theoretical curve $C_z(\alpha)$ describing the lift coefficient $C_z$ as a function of the angle of attack $\alpha$. The lift coefficient $C_z$ increases linearly with the angle of attack $\alpha$ until a stall angle of attack $\alpha_{stall}$ is reached. The affine part of the theoretical curve $C_z(\alpha)$ corresponds to the part of the curve for which the lift coefficient $C_z$ increases linearly with the angle of attack $\alpha$. FIG. 4 represents the effect of the extension of the slats 10. The dotted line illustrates the modification of the theoretical curve $C_z(\alpha)$ when the slats 10 are extended. This FIG. 4 shows that the affine part is extended and that the slope $C_{z\alpha}$ of the affine part is not modified.

Figure 5:
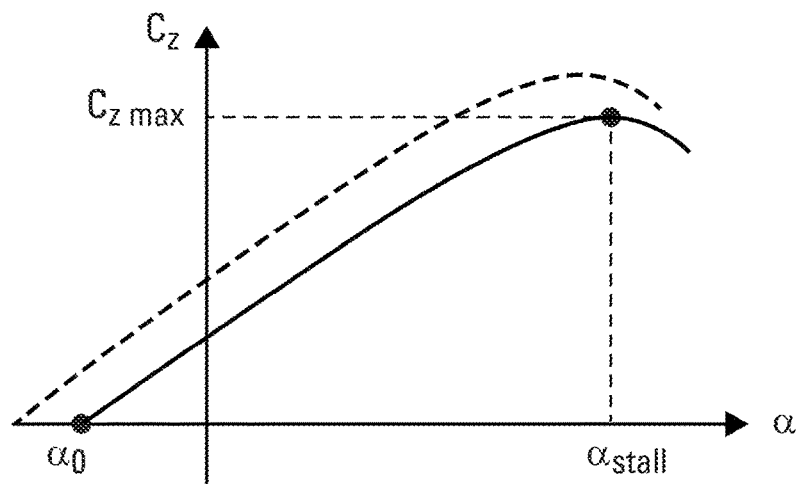
FIG. 5 represents a modification of the theoretical curve of FIG. 3 caused by an extension of the flaps.

FIG. 5 represents the effect of the extension of the flaps 7. The dotted line illustrates the modification of the theoretical curve $C_z(\alpha)$ when the flaps 7 are extended. This FIG. 5 shows that the slope $C_{z\alpha}$ of the affine part is also not modified.

Thus, whatever the positions of the slats 10 and of the flaps 7, the slope $C_{z\alpha}$ remains substantially the same.

According to a variant, the slope $C_{z\alpha}$ is determined from a theoretical curve $C_z(\alpha)$.

According to another variant, the slope $C_{z\alpha}$ can correspond to an average of slopes of several theoretical curves $C_z(\alpha)$ according to different positions of slats 10 and of flaps 7.

Figure 7:
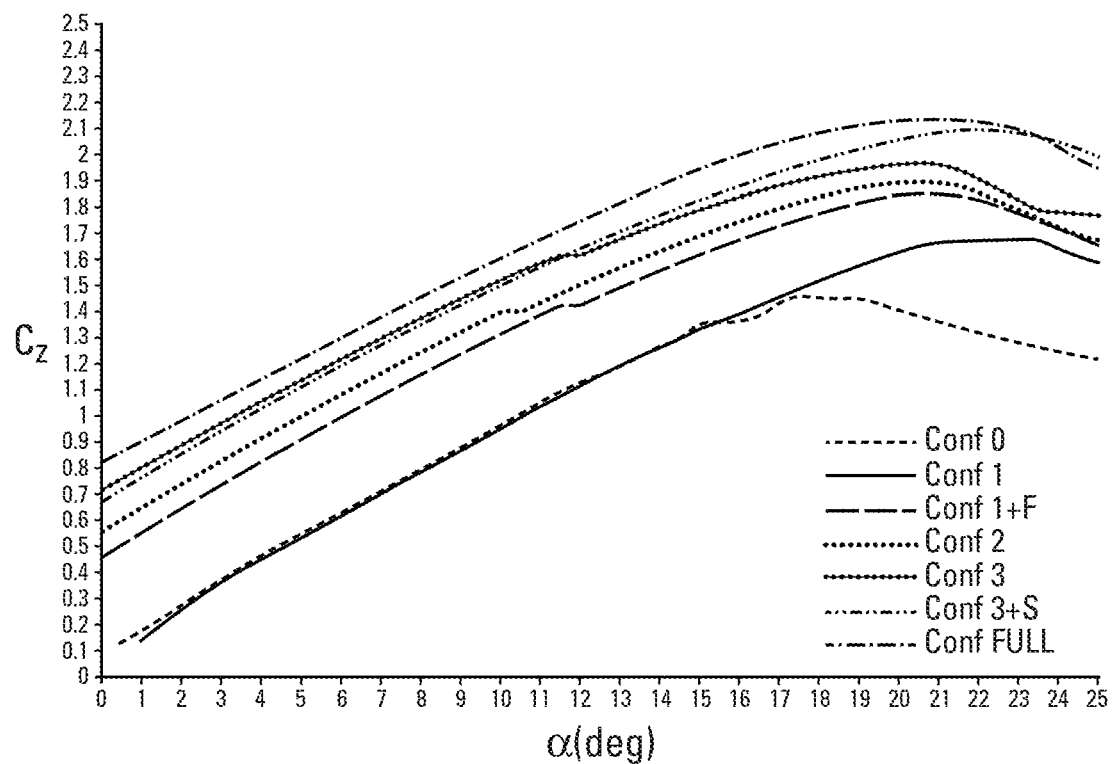
FIG. 7 represents theoretical curves describing a lift coefficient as a function of an angle of attack for several configurations of the aircraft.

FIG. 7 represents theoretical curves $C_z(\alpha)$ for an aircraft AC shown according to seven different configurations for which the flaps 7 and the slats 10 are in a position. The estimating system 1 can comprise a determination module DET 8 configured to determine the theoretical curve or curves $C_z(\alpha)$. Each of the theoretical curves $C_z(\alpha)$ is determined for a configuration of the aircraft AC. The theoretical curves $C_z(\alpha)$ thus determined can be stored in an embedded memory.

The position of the flaps and of the slats as a function of the configuration control lever depends on the type of aircraft.

As an example, for a particular type of aircraft, the configurations for which the theoretical curves $C_z(\alpha)$ are represented in FIG. 7 exhibit the following characteristics with respect to the position of the flaps and of the slats:

a configuration called "CONF 0" in which the slats have a 0° deflection and the flaps have a 0° deflection. This configuration, which is also called "clean configuration", is used in particular during cruising phases of the aircraft, a configuration called "CONF 1" in which the slats have an 18° deflection and the flaps have a 0° deflection, a configuration called "CONF 1+F" in which the slats have an 18° deflection and the flaps have a 12° deflection, a configuration called "CONF 2" in which the slats have an 18° deflection and the flaps have a 20° deflection, a configuration called "CONF 3" in which the slats have an 18° deflection and the flaps have a 26° deflection, a configuration called "CONF 3+S" in which the slats have a 27° deflection and the flaps have a 26° deflection, and a configuration called "CONF 4" in which the slats have a 27° deflection and the flaps have a 37° deflection.

Each of the theoretical curves $C_z(\alpha)$ is defined for a possible configuration of the aircraft AC. The slope $C_{z\alpha}$ is estimated from one of the theoretical curves $C_z(\alpha)$ or from the average of the slopes $C_{z\alpha}$ of at least two of the theoretical curves $C_z(\alpha)$.

The angle of attack $\alpha_0$ for which the lift coefficient $C_z$ is zero can be determined at the point where the theoretical curve $C_z(\alpha)$ intersects the x axis. The angle of attack $\alpha_0$ can therefore be determined by the expression $$\alpha_0 = \alpha - \frac{C_z}{C_{z\alpha}},$$

in which $\alpha$ corresponds to the current angle of attack measured by the measuring module 2, $C_z$ corresponds to the current lift coefficient estimated by the estimating module 3 and $C_{z\alpha}$ corresponds to the slope of the affine part of at least one theoretical curve $C_z(\alpha)$ describing a lift coefficient as a function of an angle of attack.

The estimation system 1 further comprises a third estimating module ESTIM3 5 configured to estimate the current position of the flaps 7 of the aircraft AC from the angle of attack $\alpha_0$ for a zero lift, estimated by the second estimating module 4.

As represented in FIG. 5, the effect of the extension of the flaps 7 is to increase the lift coefficient $C_z$ for a given angle of attack or else, equivalently, to reduce the angle of attack $\alpha_0$ for a zero lift. On the theoretical curve $C_z(\alpha)$, the extension of the flaps 7 is reflected by a translation of the theoretical curve $C_z(\alpha)$ to the left. The angle of attack $\alpha_0$ for a zero lift is therefore linked to the position of the flaps 7.

From the estimated current position of the flaps (7) of the aircraft (AC), the current configuration or configurations of the aircraft (AC) can be determined.

As an example, the table below represents an interpolation table that makes it possible to determine at least one configuration out of the configurations whose theoretical curves $C_z(\alpha)$ are represented in FIG. 7.

| | $\alpha_0$ | | | | |
|---|---|---|---|---|---|
| | −1.15° | −5.48° | −6.67° | −8.70° | −10.51° |
| Position of the flaps | 0° | 12° | 20° | 26° | 37° |
| CONF | 0 or 1 | 1 + F | 2 | 3 or 3 + S | 4 |

The estimation system also comprises a sending module SEND 6 configured to send the current position of the flaps 7 to a user device 9.

The sending module SEND 6 can also be configured to send the configuration to the user device USER 9.

According to one embodiment, the modules are incorporated in a central processing unit or a computer.

As an example, the modules can correspond to algorithms implemented by software in the central processing unit.

In particular, the modules can be stored in at least one memory area of the central processing unit.

The method for estimating the position of the flaps 7 of an aircraft AC comprises:

a measurement step E2, implemented by the measuring module 2, including measuring the current angle of attack $\alpha$ of the aircraft AC and current flight parameters of the aircraft AC;

an estimation step E3, implemented by the estimating module 3, including estimating the current lift coefficient $C_z$ of the aircraft AC from the current flight parameters and from the mass m of the aircraft AC;

an estimation step E4, implemented by the estimating module 4, including estimating the angle of attack $\alpha_0$ for a zero lift from the current angle of attack $\alpha$, from the current lift coefficient $C_z$ estimated in the estimation step E3 and from the slope $C_{z\alpha}$ of an affine part of at least one theoretical curve $C_z(\alpha)$ describing the lift coefficient of the aircraft AC as a function of an angle of attack;

an estimation step E5, implemented by the estimating module 5, including estimating the current position of the flaps 7 of the aircraft AC from the angle of attack $\alpha_0$ for a zero lift, estimated in the estimation step E4;

a sending step E6, implemented by the sending module 6, including sending the current position of the flaps 7 to the user device 9.

The measurement step E2 comprises:

a measurement substep E21, implemented by the measuring submodule 21, including measuring a vertical component of a current load factor $n_z$ of the aircraft AC;

a measurement substep E22, implemented by the measuring submodule 22, including measuring a current static pressure $P_s$;

a measurement substep E23, implemented by the measuring submodule 23, including measuring a current Mach number M of the aircraft (AC);

a measurement substep E24, implemented by the measuring submodule 24, including measuring the current angle of attack $\alpha$ of the aircraft AC.

The estimation step E3 includes estimating the current lift coefficient $C_x$ of the aircraft AC from the expression:

$$C_z = \frac{2n_z mg}{\gamma P_s M^2 S}.$$

The method can also comprise a determination step E1, implemented by the determination module 8, including determining the theoretical curve or curves $C_z(\alpha)$.

The estimation step E5 also includes estimating the current configuration or configurations of the aircraft AC from the estimated current position of the flaps 7 of the aircraft AC.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for estimating the position of flaps of an aircraft, comprising:
a measurement step, implemented by a measuring module, including measuring a current angle of attack of the aircraft and current flight parameters of the aircraft;
a first estimation step, implemented by a first estimating module, including estimating a current lift coefficient of the aircraft from the current flight parameters and from a mass of the aircraft;
a second estimation step, implemented by a second estimating module, including estimating an angle of attack ($\alpha_0$) for a zero lift from the current angle of attack, from the current lift coefficient estimated in the first estimation step and from a slope ($C_{z\alpha}$) of an affine part of at least one theoretical curve describing a lift coefficient of the aircraft as a function of an angle of attack;
a third estimation step, implemented by a third estimating module, including estimating the current position of the flaps of the aircraft from the angle of attack for a zero lift, estimated in the second estimation step; and
a sending step, implemented by a sending module, including sending the current position of the flaps to a user device.

2. The method according to claim 1, wherein the measurement step comprises:
a first measurement substep, implemented by a first measuring submodule, including measuring a vertical component of a current load factor of the aircraft;
a second measurement substep, implemented by a second measuring submodule, including measuring a current static pressure;
a third measurement substep, implemented by a third measuring submodule, including measuring a current Mach number of the aircraft; and
a fourth measurement substep, implemented by a fourth measuring submodule, including measuring the current angle of attack of the aircraft.

3. The method according to claim 1, wherein the first estimation step includes estimating the current lift coefficient of the aircraft from the following expression:

$$C_z = \frac{2n_z mg}{\gamma P_s M^2 S},$$

in which:
$n_z$ corresponds to the vertical component of a current load factor of the aircraft,
m corresponds to the current mass of the aircraft,
g corresponds to the acceleration of gravity,
$\gamma$ corresponds to the adiabatic coefficient for air,
$P_s$ corresponds to the current static pressure,
M corresponds to the current Mach number of the aircraft,
S corresponds to a reference surface of wings of the aircraft.

4. The method according to claim 1, wherein the slope used in the second estimation step corresponds to an average of slopes, each of the slopes corresponding to a slope of the affine part of each of the theoretical curves describing a lift coefficient of the aircraft as a function of an angle of attack.

5. The method according to claim 1, wherein each of the theoretical curves is defined for a possible configuration of the aircraft.

6. The method according to claim 1, further comprising a determination step, implemented by a determination module, including determining the theoretical curve or curves, each of the theoretical being determined for a configuration of the aircraft.

7. The method according to claim 1, wherein the third estimation step also includes estimating the current configuration or configurations of the aircraft from the estimated current position of the flaps of the aircraft.

8. A system for estimating the flaps position of an aircraft, comprising:
- a measuring module configured to measure a current angle of attack of the aircraft and current flight parameters of the aircraft;
- a first estimating module configured to estimate a current lift coefficient of the aircraft from the current flight parameters and from a mass of the aircraft;
- a second estimating module configured to estimate an angle of attack for a zero lift from the current angle of attack, from the current lift coefficient estimated by the first estimating module and from a slope of an affine part of at least one theoretical curve describing a lift coefficient of the aircraft as a function of an angle of attack;
- a third estimating module configured to estimate the current position of the flaps of the aircraft from the angle of attack for a zero lift estimated by the second estimating module; and
- a sending module configured to send the current position of the flaps to a user device.

9. The system according to claim 8, wherein the measuring module comprises:
- a first measuring submodule configured to measure a vertical component of a current load factor of the aircraft;
- a second measuring submodule configured to measure a current static pressure;
- a third measuring submodule configured to measure a current Mach number of the aircraft; and
- a fourth measuring submodule configured to measure the current angle of attack of the aircraft.

10. The system according to claim 8, further comprising a determination module configured to determine the theoretical curves or curves, each of the theoretical curves being determined for a configuration of the aircraft (AC).

11. An aircraft comprising a system for estimating the position of the flaps of an aircraft, according to claim 8.

* * * * *